(12) United States Patent
Zangenberg

(10) Patent No.: US 7,340,964 B2
(45) Date of Patent: Mar. 11, 2008

(54) CORIOLIS MASS FLOW METER

(75) Inventor: Jan Zangenberg, Nordborg (DK)

(73) Assignee: Siemens Flow Instruments A/S, Nordborg (DK)

( * ) Notice: Subject to any disclaimer, the term of this patent is extended or adjusted under 35 U.S.C. 154(b) by 49 days.

(21) Appl. No.: 11/362,200

(22) Filed: Feb. 27, 2006

(65) Prior Publication Data

US 2006/0283264 A1 Dec. 21, 2006

Related U.S. Application Data

(63) Continuation of application No. PCT/DK03/00559, filed on Aug. 26, 2003.

(51) Int. Cl.
*G01F 1/84* (2006.01)
(52) U.S. Cl. .................................. 73/861.355
(58) Field of Classification Search ............ None
See application file for complete search history.

(56) References Cited

U.S. PATENT DOCUMENTS

| | | | |
|---|---|---|---|
| 4,756,198 A | 7/1988 | Levien | |
| 4,781,069 A | 11/1988 | Mitzner | |
| 4,811,606 A * | 3/1989 | Hasegawa et al. | 73/861.357 |
| 5,271,281 A | 12/1993 | Mattar et al. | |
| 5,370,002 A | 12/1994 | Normen et al. | |
| 6,415,668 B1 | 7/2002 | Cage | |
| 6,776,052 B2 * | 8/2004 | Crisfield et al. | 73/861.354 |
| 7,004,037 B2 * | 2/2006 | Andresen et al. | 73/861.355 |

* cited by examiner

*Primary Examiner*—Harshad Patel
(74) *Attorney, Agent, or Firm*—Sughrue Mion, PLLC

(57) ABSTRACT

A Coriolis mass meter with two tube sections connected by a coupling extending between connection points of the tube sections wherein the coupling extends a distance between the connection points which exceeds the shortest perpendicular distance between the first and the second tube sections. The coupling facilitates less stiffness of the tubes against Coriolis oscillation and thus provides a mass meter with a stronger and potentially more reliable measuring signal.

15 Claims, 4 Drawing Sheets

CORIOLIS MASS FLOW METER

This is a Continuation of International Application PCT/DK03/00559, with an international filing date of Aug. 26, 2003, which was published under PCT Article 21(2) in English, and the disclosure of which is incorporated into this application by reference.

FIELD OF AND BACKGROUND OF THE INVENTION

The present invention relates to a Coriolis mass flow meter wherein mass flow of a fluid medium flowing in a tubular conduit is measured as a function of Coriolis influenced oscillation of the conduit. In particular, the invention relates to a flow meter of the kind provided with two loops of adjacently arranged tubes connected to a driver for oscillation of the tubes in a driven oscillation in opposite phases. In order to separate a driven oscillation from a common mode oscillation being similar to the driven oscillation but in phase, the two loops are connected by a coupling extending between connection points of each of the tubular conduits. This separation facilitates enhanced measuring results from the meter.

OBJECTS OF THE INVENTION

Coriolis mass flow meters are widely used for determining mass flow in various applications, e. g. in connection with medical devices for blood gas analyses, for chemical dosing in process plants etc. In a Coriolis mass flow meter, a flow medium to be measured is caused to flow through a tube which is forced to oscillate. The oscillation will be influenced by the Coriolis force acting on the tube and since this force is proportional with the mass flow through the tube, the oscillation of the tube is representative of the mass flow. In regular mass flow meters, a tube is arranged in a looped configuration forcing the medium to change flow direction a number of times. The oscillation of the tube is typically forced mechanically by a driver arranged to act on the tube on an excitation point. The oscillation of an associated measuring point, distant from the point of excitation, is detected, and subsequently, the mass flow rate can be determined from a phase shift between the forced oscillation and oscillation of the tube in the measuring point, or in some applications, between two measuring points arranged along the tube at a distance from each other.

Transmission of vibrations from the flow meter to surrounding objects may be undesirable and e. g. for that reason, meters have been designed wherein the tube is arranged in two loops of equal size, one of the loops being arranged above the other loop and both loops being forced to vibrate in opposite phases. The loops can be formed from one or two pieces of a tube, either connected to form one integrated flow channel for the medium or split into two separate flow channels of each of the loops. At an inlet-end and an outlet-end, the loops are held fixed to a chassis of the flow meter. In some of these meters, the excitation point is selected in the middle between two looped portions of the tube. At two measure points having an equal distance to the excitation point, pick-ups capable of transforming the oscillations of the tube into an analogue electrical signal, is arranged. In that way, the oscillation is detected at each measure point and for each of the loops.

As the medium flows through the tube, the impact of the Coriolis force introduces a phase shift between the oscillations at the two measuring points. If the loops, however, have been designed and arranged symmetrically, the oscillation of one of the loops may still be in opposite phase with the oscillation of the other one of the loops even after the introduction of the phase shift between the measuring points. As a result, the loops oscillate with at least a phase-shifted oscillation (in the following referred to as the Coriolis oscillation), an oscillation mode in phase with the oscillation of the driver (in the following referred to as the driven oscillation), and optionally and unwantedly, in a common mode oscillation being in the same direction as the driven oscillation but in a phase opposite to the driven oscillation, i. e. wherein the two loops oscillate in phase).

In general, it is desired to separate the common mode oscillation from the driven oscillation and from the Coriolis oscillation. For that purpose, the two loops may at various locations be connected in coupling points, e. g. via coupling plates. The coupling points are selected at certain distances from the excitation point along the tube(s) and, preferably, so that the measuring points are placed between the excitation point and the coupling points. In the known mass meters, loops forming adjacent planes are connected by rod shaped coupling plates extending in a direction perpendicular to the planes. Accordingly, oscillation of such loops in the driven mode and in the Coriolis mode, i. e. oscillation in opposite directions perpendicular to the planes, requires alternating stretching and compression of the coupling plates which plate stiffens the loops strongly. Since a precise measuring depends on large amplitude of the Coriolis oscillation, the stiffening of the tubes is undesirable.

SUMMARY OF THE INVENTION

It is an object of the invention to provide an improved coupling between loops of a Coriolis mass meter which is capable of separating the common mode oscillation from the driven oscillation and from the Coriolis oscillation without influencing the stiffness of the tubes negatively with respect to the amplitude of the Coriolis oscillation. Accordingly, the present invention provides a mass flow meter working on the Coriolis principle and comprising:

a first and a second measuring tube for having fluid flow there through, and
  a coupling extending between connection points of the first and the second measuring tube characterized in that the coupling extends a distance between the two connection points which exceeds the shortest perpendicular distance between the first and the second measuring tube.

Since the coupling extends a distance exceeding the shortest distance between the coupling points, the tubes are allowed, at least to a certain extend, to move in a direction towards and away from each other, i. e. to follow the Coriolis oscillation and the driven oscillation while the coupling may separate other modes of oscillation from the driven and the Coriolis oscillation.

As an example, the coupling may have at least one arm which extends in a direction at an angle to the oscillating direction, i. e. the arm is non parallel to the direction of oscillation or, in other words, it extends in a direction different from zero or any integer times 180 degrees to the direction of oscillation. The oscillating direction could be defined by a driver attached to the meter for oscillating the tubes in a forced oscillation in the oscillating direction, i. e. in a direction in which a point on the surface of one of the tubes moves. During oscillation of the tubes, the coupling may deflect towards a shape wherein the at least one arm becomes more parallel to the oscillating direction, and during this deflection, the tubes are given more freedom to oscillate. Accordingly, and in contrary to couplings being entirely parallel to oscillating direction, the arms (namely a first and a second arm) being non-parallel to the plane of oscillation stiffens the tubes mainly towards the driven oscillation and less towards the Coriolis oscillation and thus improves separation of the various oscillation modes without or at least substantially without influencing the amplitude of the Coriolis oscillation.

Often, Coriolis mass meters are made from two tube sections, each arranged in a loop, typically arranged in a plane. The loops cause the fluid to change direction as it flows through the tube. In such meters, the first arm and/or second arm preferably extends(s) in a direction which is non perpendicular to planes defined by the loops of the tube sections, and to enable most freedom to deflect, the first arm and/or second arm may be parallel to planes defined by the loops. In other words, the coupling may have at least one of the first and second arms extending between a first and a second connection point of one of the tube sections, and preferably, the coupling comprises both the first and the second arm, each extending between a first and a second connection point on respective tube sections. The two arms could be connected by a third arm, e. g. extending parallel to the oscillating direction. The third arm may at each of its opposite ends be joined to one of the first and the second arms , e. g. at a point intermediate between the first and second connection points, e. g. halfway along the first and/or the second arms between the first and second connection points. The third arm may extend e. g. parallel to oscillating direction and e. g. perpendicular to the first and/or the second arms. Preferably, the above described coupling of the two tube sections has an H-shape wherein each of the two tube sections are connected to the H-shaped coupling at two different locations making 4 connection points in total—i. e. one connection point at each of the free ends of the H-shape. Preferably, the first and the second arm define the two vertical lines at the right and left side of the H-shape while the third arm defines the horizontal line connecting the two vertical lines of the H-shape.

In order to stiffen the tubes even less, the first and/or the second arm could be made as elongate, rod shaped sections, with a cross sectional shape which supports bending of the sections in the oscillating direction and which prevents bending in other directions. The first and/or the second arm could further be made from any material which does not contribute to dampening of the oscillations e. g. from plastic or metal. The first and/or the second arm could be joined to the third arm in joints allowing reorientation, e. g. via bending or rotation of one section in relation to the other section.

The tube sections may both form loops, e. g. parallel loops connected to a driver for driving oscillation of the loops in opposite phases. Moreover, the first and second tube sections may be separate tubes each forming intake and outlet openings for the fluid. In this embodiment, the coupling may extend through a point with substantially equal distance to the intake and the outlet openings of at least one of the two tubes, and optionally, the coupling extends through a point with substantially equal distance to the intake openings and to the outlet openings of both of the tube sections.

In order to fasten the tubes to a chassis and in order further to separate the various modes of oscillation, the meter may further have a bracing connecting the tubes to a chassis, e. g. a bracing extending between the coupling and the chassis. In a preferred embodiment, the bracing extends substantially parallel to the oscillating direction and in an alternative embodiment the bracing extends at an angle to the oscillating direction, e. g. 90% to the oscillating direction. In respect of an H-shaped coupling, the bracing may extend in a direction substantially parallel to the first and/or the second arm, i. e. in parallel to the two vertical parts of the H-shaped coupling. The bracing may e. g. intersect the third arm, i. e. intersect the horizontal part of the H-shaped coupling, e. g. at a point midway between the first and/or the second arm. Alternatively, the bracing may define an extension of the length of the horizontal part of the H-shaped coupling, i. e. an extension of the third arm. The length of the horizontal part may be extended to one or both sides to make the horizontal part intersect one or both of the vertical parts, i. e. the first and/or the second arms.

Any of the above mentioned features of the mass meter may be combined.

BRIEF DESCRIPTION OF THE DRAWINGS

In the following, a preferred embodiment of the invention will be described in further details with reference to the drawing in which.

DETAILED DESCRIPTION OF THE PREFERRED EMBODIMENTS

Figure 1:
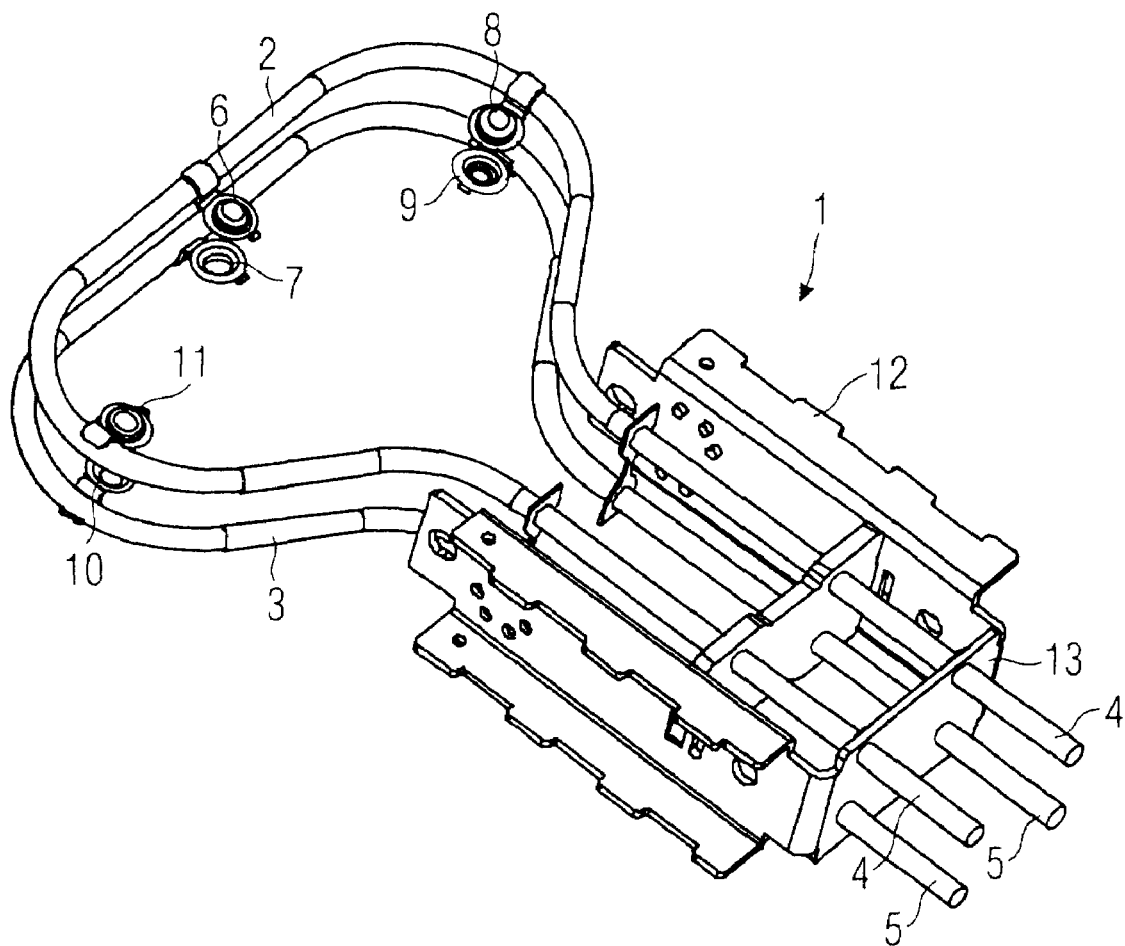
FIG. 1 shows a Coriolis mass meter according to the invention.

FIG. 1 shows a mass meter 1 with a first tube section 2 and a second tube section 3. The first tube section extends between intake and outlet ends 4 and the second tube section extends between intake and outlet ends 5. Each tube section is made with an excitation point 6, 7 for connection of a driver for forced oscillation and two sensing points 8, 9, 10, 11 for connection of a pick up for sensing the oscillation and thus the phase shift introduced by the Coriolis force. The mass meter further comprises a chassis 12 comprising an end plate 13 with openings allowing the tubes to extend out of the mass meter.

Figure 2:
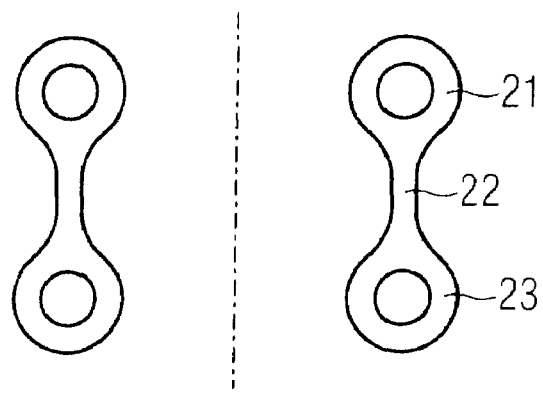
FIG. 2 shows a view of a prior art coupling.

FIG. 2 shows a view of a prior art coupling comprising a circular opening 21 for receiving a first tube section and a circular opening 23 for receiving a second tube section. A body portion 22 extends between the openings.

Figure 3:
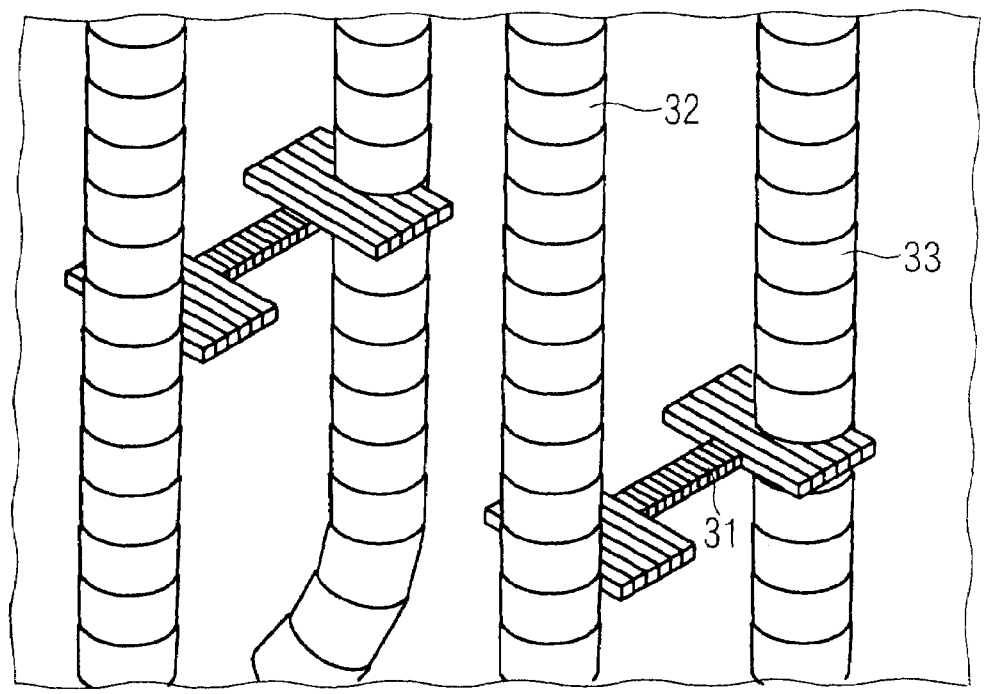
FIG. 3 shows a view of tubes of a prior art mass meter.

FIG. 3 shows a view of tubes of a prior art mass meter wherein the prior art coupling 31 corresponding to the coupling shown in FIG. 2 is inserted across first and second tube sections 32, 33.

Figure 4:
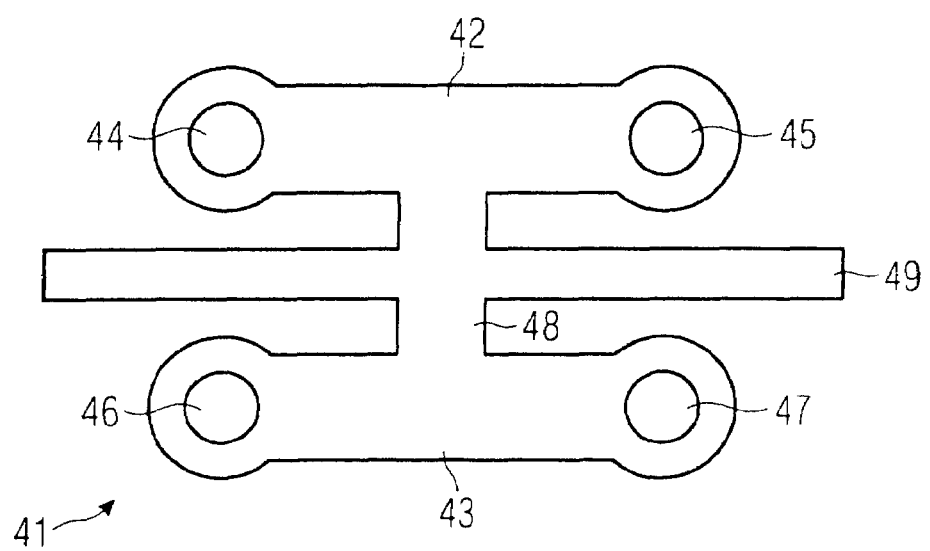
FIG. 4 shows an H-shaped coupling.

FIG. 4 shows an H-shaped coupling 41 according to the present invention. The coupling comprises a first arm 42, and a second arm 43 each made with two holes 44, 45, 46, 47 for receiving each tube section at two different locations. The first and the second arms are connected by third arm 48, which at both of its axially disposed ends joins with the first and second arms approximately halfway between the two holes, and thus halfway between connection points of tube sections of an associated mass meter. The coupling further comprises a bracing 49 for connecting the bracing and thus the tubes to a chassis. The bracing extends in a direction substantially parallel to the two arms 42, 43.

Figure 5:
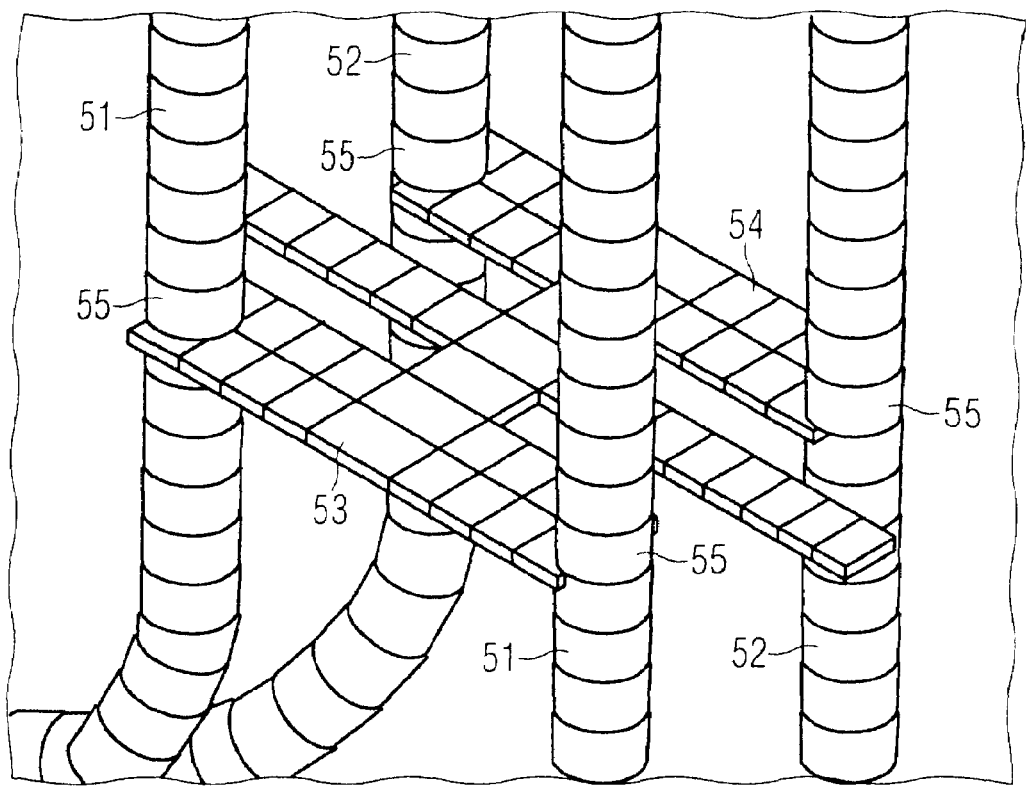
FIG. 5 shows the coupling of FIG. 4 inserted in a mass meter.

FIG. 5 shows the coupling of FIG. 4 inserted in a mass meter. As shown, each of the two tube sections 51, 52 form loops defining planes. The first and the second arms 53, 54 are substantially parallel to the planes. The coupling is connected to the tubes in connection points 55. Due to the H-shape of the coupling and the location of the connection points, the distance along the coupling from one connection point of one tube section to the other connection point of the same section exceeds the shortest perpendicular distance between the tube sections.

Figure 6:
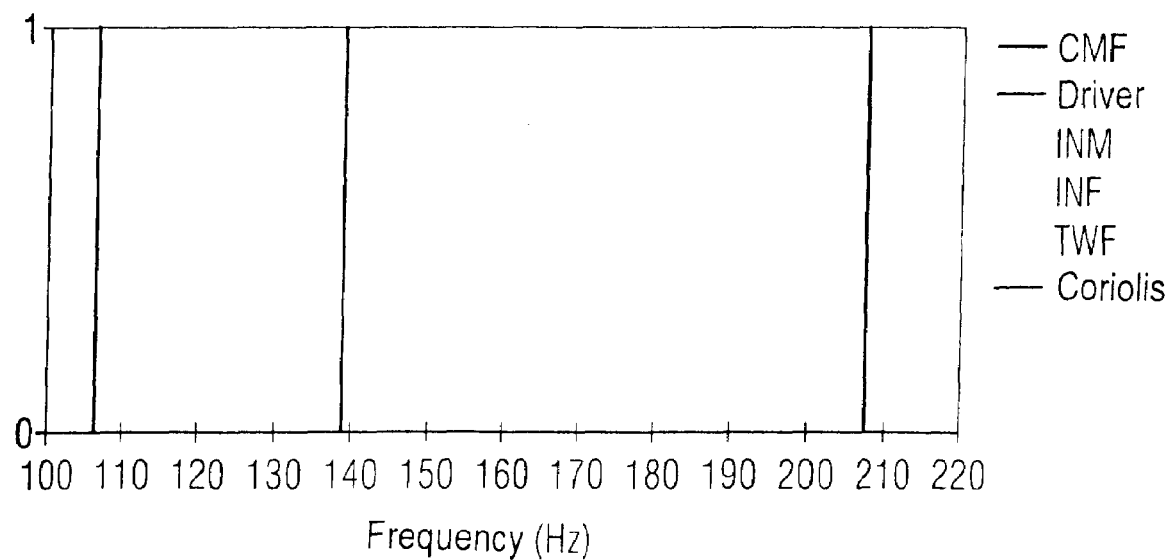
FIGS. 6 and 7 show graphical views of main frequencies of mass meters with, respectively, a prior art coupling and a coupling according to the present invention.

FIG. 6 shows the 3 main frequencies of interest with a prior art coupling plate—the common mode frequency at 108 Hz, the driver frequency at 138 Hz and the Coriolis frequency at 208 Hz.

Figure 7:
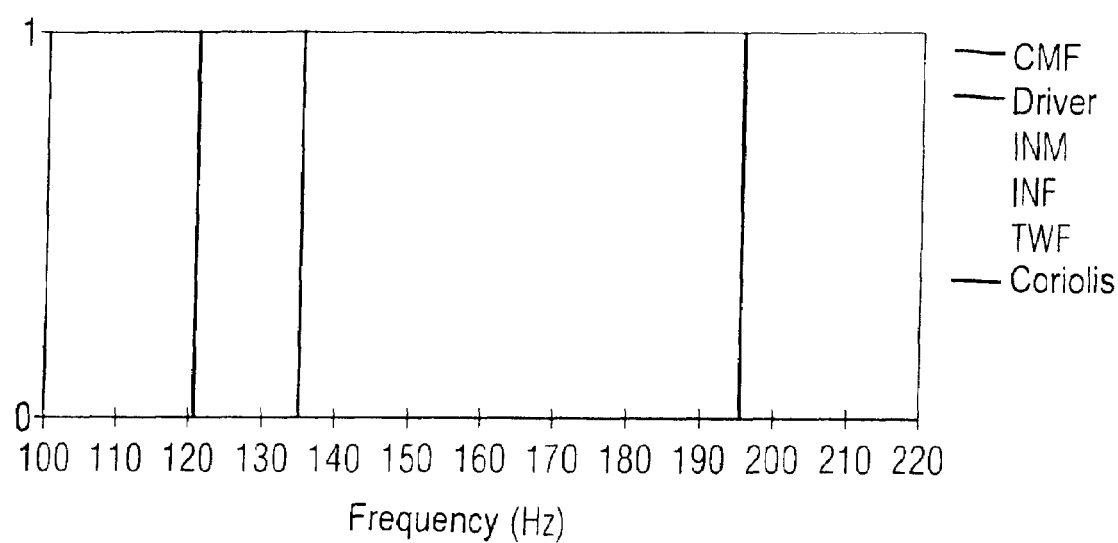

FIG. 7 shows the same frequencies with a coupling plate according to the present invention. The respective frequencies are 121, 135 and 195 Hz. One interesting aspect is the frequency difference between the driver frequency and the Coriolis frequency. This distance should be as little as possible to make the meter as sensitive to Coriolis forces as possible. The improvement in sensitivity may also depend on other design features. In an actual case the improvement has been calculated to 21%.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A mass flow meter based on Coriolis principle, comprising:
    a first section and a second section of a tube operable to have fluid flowing there through;
    a first arm of a coupling extending between a connection point of the first tube section on a first side and a connection point of the first tube section on a second side;
    a second arm of the coupling extending between a connection point of the second tube section on the first side and a connection point of the second tube section on the second side;
    a third arm of the coupling connecting the first and second arms approximately halfway between the respective connection points; and
    a driver operable to oscillate the tube in an oscillating direction.

2. A meter according to claim 1, wherein at least one of the first and second tube sections forms a loop defining a plane.

3. A meter according to claim 1, wherein one of said first arm and the second arm extends in a direction at an angle to the oscillating direction.

4. A meter according to claim 1, wherein the third arm extends parallel to the oscillating direction.

5. A meter according to claim 1, wherein the third arm is perpendicular to the first arm and the second arm.

6. A meter according to claim 1, wherein the third arm is joined to the first and the second arms using joints at least one of said joints being operable to allow reorientation of the third arm in relation to a corresponding one of said first and second arms.

7. A meter according to claim 1, wherein both the first and second tube sections form loops defining planes.

8. A meter according to claim 1, wherein the planes are parallel.

9. A meter according to claim 1, wherein the first and second tube sections are two separate tubes each forming intake and outlet openings for the fluid.

10. A meter according to claim 9, wherein the coupling extends through a point with substantially equal distance to the intake and the outlet openings of at least one of the two tube sections.

11. A meter according to claims 9, wherein the coupling extends through a point with substantially equal distance to the intake openings and to the outlet openings of both the first and second tube sections.

12. A meter according to claim 1, further comprising a bracing for connecting the coupling to a chassis.

13. A meter according to claim 12, wherein the bracing extends substantially parallel to the oscillating direction.

14. A meter according to claim 12, wherein the bracing extends at an angle to the oscillating direction.

15. A meter according to claim 1, wherein distance between the first side and the second side of the first tube exceeds a shortest perpendicular distance between the first and the second tube sections.

* * * * *